United States Patent [19]
Acker et al.

[11] Patent Number: 6,009,209
[45] Date of Patent: Dec. 28, 1999

[54] AUTOMATED REMOVAL OF RED EYE EFFECT FROM A DIGITAL IMAGE

[75] Inventors: Kristin Acker; David L. Bien, both of Seattle; Daryl T. Lawton, Bellevue, all of Wash.

[73] Assignee: Microsoft Corporation, Redmond, Wash.

[21] Appl. No.: 08/884,207

[22] Filed: Jun. 27, 1997

[51] Int. Cl.$^6$ ...................................................... H04N 1/46
[52] U.S. Cl. .......................................... 382/275; 358/520
[58] Field of Search ................................... 382/274–276, 382/162–167; 358/518–523

[56] References Cited

U.S. PATENT DOCUMENTS

| | | | |
|---|---|---|---|
| 5,130,789 | 7/1992 | Dobbs et al. | 358/75 |
| 5,247,610 | 9/1993 | Oshima et al. | 345/435 |
| 5,432,863 | 7/1995 | Benati et al. | 382/167 |
| 5,805,745 | 9/1998 | Graf | 382/291 |
| 5,825,941 | 10/1998 | Linford et al. | 382/294 |

OTHER PUBLICATIONS

Akamatsu, et al., "An Accurate and Robust Face Identification Scheme," *IEEE*, 217–220 (1992).

Brunelli, et al., "Caricatural Effects in Automated Face Perception", *Biological Cybernetics*, 69, 235–241 (1993).

Chen, et al., "Human Face Recognition From a Single Front View," *International Journal of Pattern Recognition and Artificial Intelligence*, 6 (4), 571–693 (1992).

Chow, et al., "Towards a System for Automatic Facial Feature Detection," *Pattern Recognition*, 26 (12), 1739–1755 (1993).

Huang, et al., "Automatic Feature Point Extraction on a Human Face in Model–based Image Coding," *Optical Engineering*, 32 (7), 1571–1580 (1993).

Huang, et al, "Human Facial Feature Extraction for Face Interpretation and Recognition," *IEEE*, 25 204–207 (1992).

Huang, et al. "Human Facial Feature Extraction for Face Interpretation and Receognition," *Pattern Recognition*, 25 (12), 1435–1444 (1992).

Kamel, et al. "System for the Recognition of Human Faces," *IBM Systems Journal*, 32 (2), 307–320 (1993).

Samal, et al. "Automatic Recognition and Analysis of Human Faces and Facial Exressions; A Survey," *Pattern Recognition*, 25 (1), 65–77 (1992).

Adobe Photoshop® version 4.0 User Guide including Table of Contents and selected pages.

Four separate screen shots (four sheets) from Adobe PhotoDeluxe (Version 1.0) showing steps to remove re eye.

LivePix 1.0 screen shot entitled "owen standing in crib with red eye" and help topic on "Remove red eye fro a photo" (2 pages).

*Primary Examiner*—Thomas D Lee
*Assistant Examiner*—Stephen Brinich
*Attorney, Agent, or Firm*—Leydig, Voit & Mayer, Ltd.

[57] ABSTRACT

An apparatus and method is disclosed for automatically editing a digital color image to remove discoloration of the image, known as a "red eye" effect, by parsing the discoloration into regions and re-coloring the area of the discoloration based on the attributes of the discoloration. The editing process according to the invention automatically creates a bitmap that is a correction image, which is composited with the source image or a copy of it and displayed as the source image with the red eye effect corrected.

26 Claims, 14 Drawing Sheets

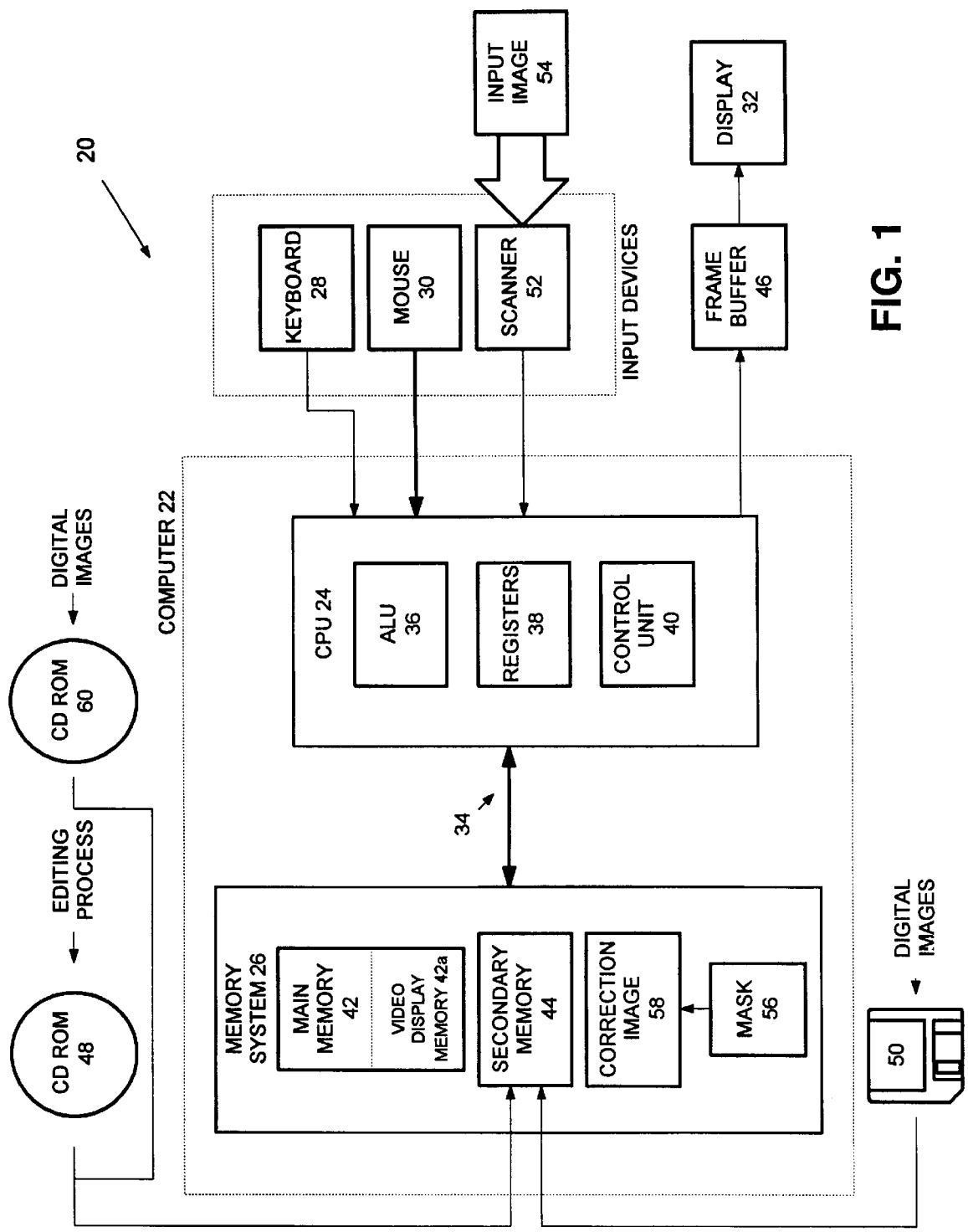

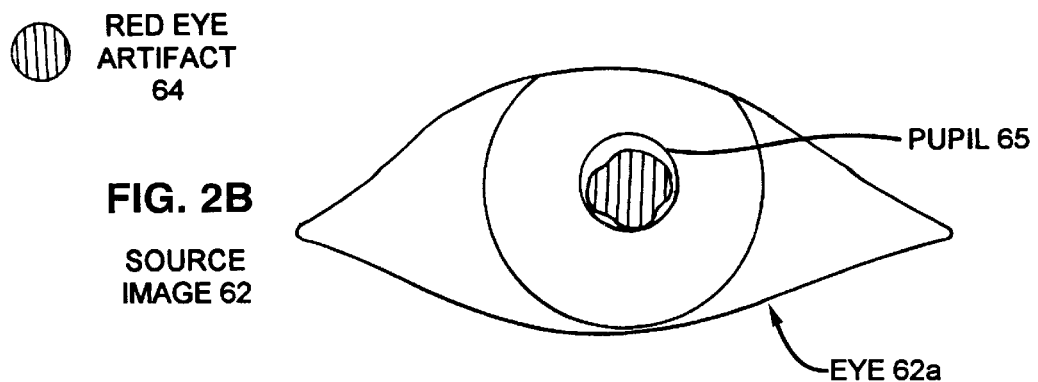
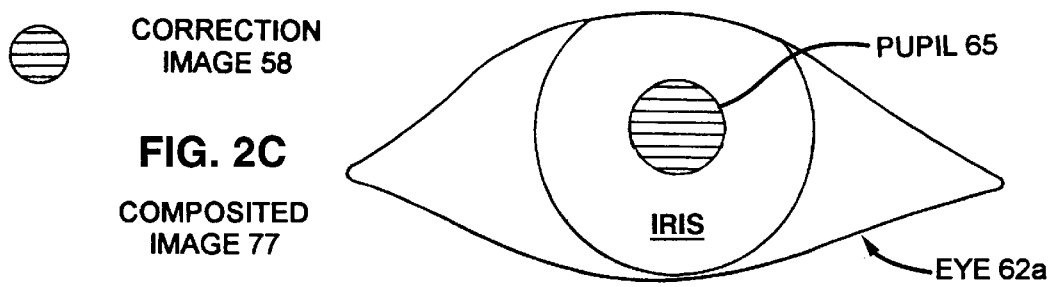
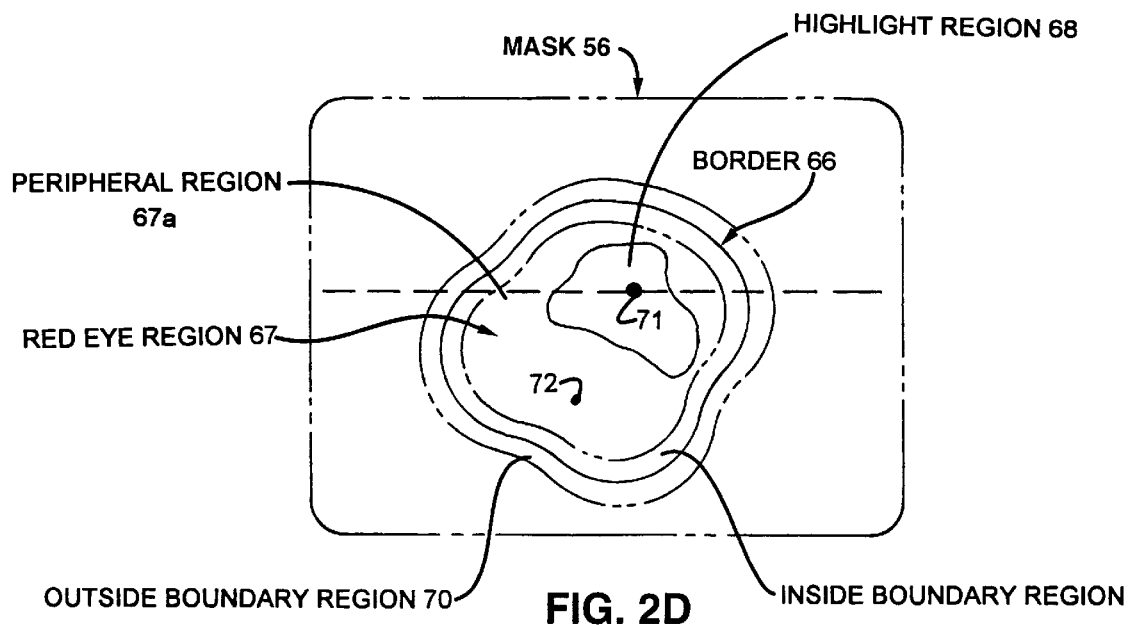

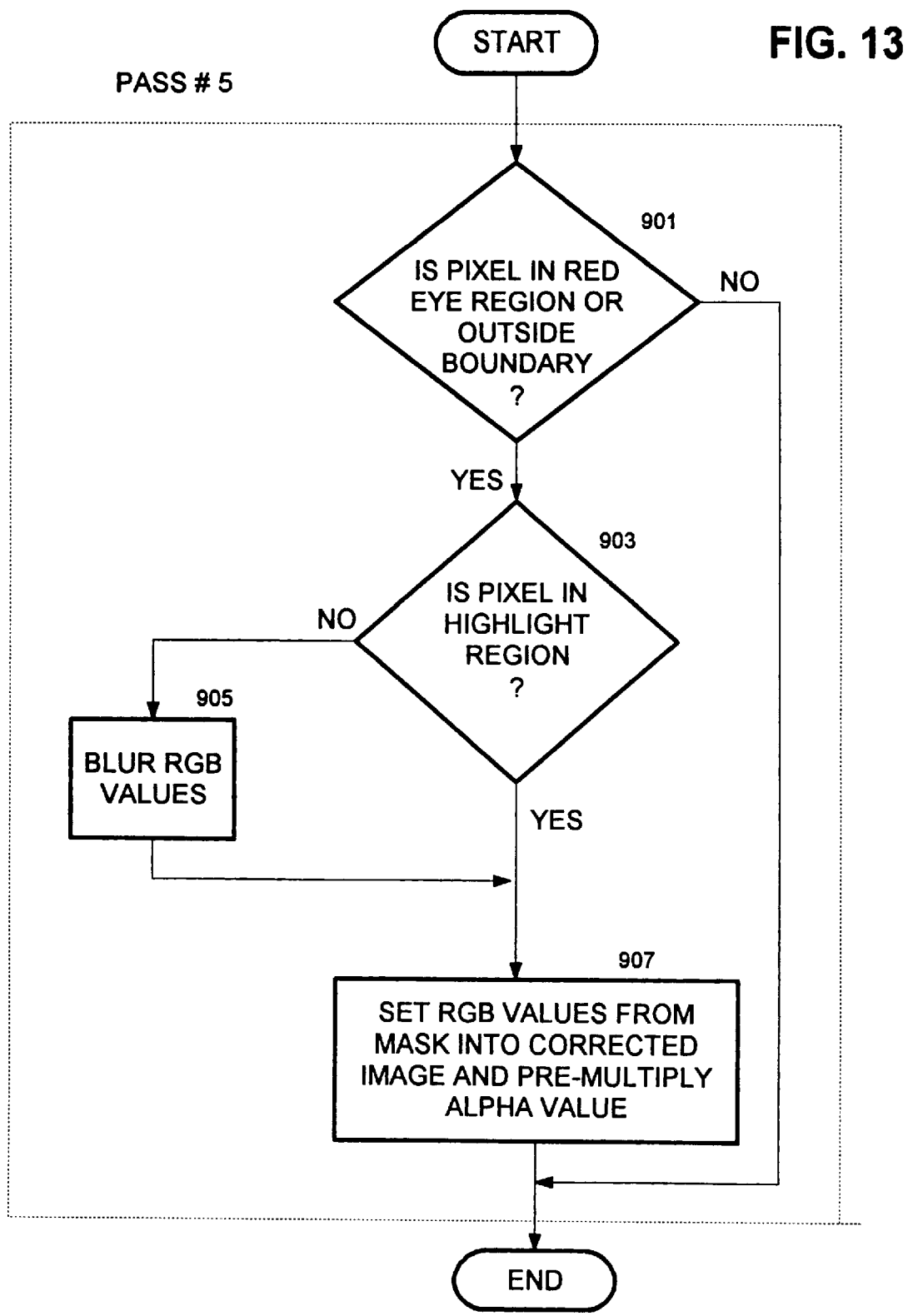

AUTOMATED REMOVAL OF RED EYE EFFECT FROM A DIGITAL IMAGE

FIELD OF THE INVENTION

This invention relates to digital image processing, and more particularly, to the processing of a digital photograph to remove an artifact sometimes called a "red eye" effect.

BACKGROUND OF THE INVENTION

Digital image processing has become a significant form of image processing because of continuing improvements in techniques and increasingly powerful hardware devices. Digital image processing techniques have augmented and, in some cases, replaced methods used by photographers in image composition and dark room processing. For example, digital image processing techniques such as contrast balancing, edge sharpening, color balancing or retouching of defects are employed for editing original photographic images. Moreover, with the aid of a computer, digitized images can be edited to achieve a variety of effects such as changing the shapes and colors of objects and forming composite images.

Until recently, real-time editing of digital graphic images was feasible only on expensive high-performance workstations with dedicated, special-purpose, hardware. The progress of integrated circuit technology in recent years has produced microprocessors with significantly improved processing power and has also reduced the costs of computer memories. These developments have made it feasible to implement advanced graphic editing techniques in personal computers. These editing techniques, however, are typically complex and require an expertise beyond that of ordinary users of personal computers.

A common artifact found in a photograph of a person or animal, especially when a flashbulb without a preflash is used when taking the picture, is a red spot or halo obscuring all or part of the pupil of each eye. This artifact, commonly called a "red eye," is typically produced when the pupil is sufficiently dilated to allow a noticeable amount of light from a source light to reflect off the back of the eye. In humans, the reflection is typically a reddish color (hence the term "red eye"); however, it can be other colors including a green color in some animals.

Techniques are known for editing a digital image to remove a "red eye" effect. These techniques, however, require digital painting skills for covering the red eye area with a corrected image of the pupil area. Normally, the pupil area of the eye does not comprise a single color, nor does it have a constant brightness. Rather, the color and brightness of the pupil area varies depending on the features of the eye and the ambient lighting. Correcting a red eye effect with a single color having a uniform brightness results in an unnatural appearance. Thus, when removing the red eye effect from a digital image using digital painting techniques, the touch-up of the image must be made in conformance with these varying color characteristics in order to achieve a corrected image that has a natural appearance.

There is a need for a digital imaging processing system in which digital painting techniques such as those described above and others can be applied to an image to correct a "red eye" effect without requiring either technical or artistic skills. Such a system would allow an unskilled user to remove a "red eye" effect from a photograph and replace it with a naturally appearing pupil area without requiring the aid of a specialist.

SUMMARY OF THE INVENTION

According to the invention, an apparatus and method automatically edits a digital color image to remove discoloration of the image, known as a "red eye" effect, by parsing the discoloration into regions and re-coloring the area of the discoloration based on the attributes of the discoloration. The editing process according to the invention automatically creates a bitmap that is a correction image, which is composited with a copy of the source image and displayed as the source image with the red eye effect corrected.

After the area of the red eye effect is identified by the user in the source image, the apparatus and method of the invention identifies and stores in a memory of the computer system attributes of the discoloration causing the red eye effect. In order to identify regions of the discoloration, statistics of these attributes are collected and the attributes are compared to reference values. Colors for each of the regions are selected from a library of possible colors, which has its colors classified by the regions. A color from each class is selected for the associated region based on the attributes of the discoloration causing the red eye effect. With the colors selected, a correction image is created that is composited with the source image in order to create a new image that is the source image with the correction image replacing the discoloration.

Applicants have empirically determined that the replacement image provides the most natural appearance after it is composited with the source image when the regions are defined as explained in detail hereinafter in connection with the detailed description of the drawings. Similarly, the colors of each region have been determined empirically to provide the most natural appearance.

The regions of the discoloration include a highlight region wherein the discoloration is the brightest. The color of the highlight region includes a linear gradient of brightness of the color. The linear gradient progresses radially from a location within the highlight region that corresponds to a location of a spot in the red eye artifact that is the brightest spot in the discoloration. The color of the region surrounding the highlight region includes a non-linear gradient of brightness that progresses radially outwardly with respect to the highlight region. The slope of the linear gradient in the highlight region is a function of a distance between the brightest and darkest spots in the discoloration. Also based on empirical study, one or more of the regions is divided into upper and lower portions whose colors are selected from the library of colors based on the attributes of the discoloration.

The attributes and regions of the discoloration are stored in a memory of the computer as a mask that is colored as generally described above and described in detail hereinafter and composited with the source image to provide an edited image that replaces the discoloration with the colored regions of the mask.

The attributes of the discoloration include the brightness of each of the pixels in the area of the discoloration. The statistics of the discoloration include the location of the brightest and darkest spots within the discoloration. The attributes also include a distance each pixel is from the brightest spot in the discoloration. The regions of the discoloration preferably include a highlight region, a peripheral region and inside and outside border regions.

Additional features and advantages of the invention will be made apparent from the following detailed description of an illustrated embodiment which proceeds with reference to the accompanying drawings.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

FIG. 1 is a block diagram of an exemplary computer system for editing digital images in accordance with the invention;

FIG. 2b is an isolated view of one of the eyes of the subject in FIG. 2a, illustrating by shading an area including and surrounding the pupil that appears as a red colored artifact in the photograph as a result of a reflection off the back of the eye;

FIG. 2c is the same isolated view of the eye illustrated in FIG. 2b, except the eye is shown after the invention has automatically corrected the image by removing the appearance of red color in and around the pupil;

FIG. 2d is a schematic diagram of the pupil area of the eye in FIGS. 2a and 2b illustrating the several regions of the eye in and around the pupil identified by the invention in order to automatically correct the "red eye" effect;

FIG. 6 is a flow diagram for collecting attributes of an area of the original image that includes the red eye artifact;

FIG. 7 is a flow diagram for collecting statistics from the attributes gathered by the process of FIG. 6 for later use in coloring regions of the mask containing the attributes of the eye; and FIG. 8 is a flow diagram for determining the size of a highlight region of the mask for the red eye artifact based on preset criteria;

FIG. 13 is a flow diagram for blurring the color of the pixels in the mask in the regions outside the highlight area and for creating a composite image that combines the mask and the source image in order to create a new image that is the source image with the red eye artifact removed and replaced by a naturally-appearing pupil.

DETAILED DESCRIPTION OF THE PREFERRED EMBODIMENT

Figure 2A:
FIG. 2a is an illustration of an exemplary screen shot of a user interface in keeping with the invention in which includes a photographic image of a face of a subject whose eyes are characterized by dilated pupils, which is typically associated with the "red eye" effect.

Turning to the drawings and referring first to FIG. 1, a computer system 20 includes a computer 22 having a central processing unit (CPU) 24, a memory system 26, and various input and output devices such as a keyboard 28, a mouse or pointer 30 and a display monitor 32. These elements are interconnected by at least one bus structure 34. CPU 24 includes a conventional arithmetic logic unit (ALU) 36 for performing computations, a collection of registers 38 for temporary storage of data and instructions, and a control unit 40 for controlling operation of the system 20. The CPU 24 may be a processor having any of a variety of architectures, including X86 from Intel and others and the Power PC from IBM and Motorola. The detailed architecture of the computer system 20 is preferably that of a conventional "personal computer," based on the architecture of the IBM PC or the Apple Macintosh and, therefore, is not described in detail herein.

The computer system 20 includes an operating system resident in the memory system 26, which is preferably the WINDOWS 95 or WINDOWS NT operating system by Microsoft Corporation of Redmond, Wash. The memory system 26 generally includes a main memory 42, which typically comprises a random access memory (RAM) and read only memory (ROM). Secondary memory 44 is typically in the form of long-term storage mediums such as floppy disks, hard disks, tape, CD-ROM, flash memory and other devices that store data using electrical, magnetic, optical or other recording media. The main memory 42 also includes video display memory 42a for displaying graphical images through the video display monitor 32.

In the computer architecture shown in FIG. 1, an image to be processed in accordance with the invention is in the form of an image file held in the video display memory 42a of the main memory 42. The image is preferably a color image in a FlashPix format. In order to display the image, the CPU 24 loads the image into a frame buffer 46 for the display monitor 32. In a conventional manner, the image in the frame buffer 46 is used to periodically refresh the image displayed on the video display monitor 32.

Editing of the digital image file is accomplished by the CPU 24. The edited image is saved in the memory system 26 as a new image file for future use or for transport to another digital image processing system. For example, the image file can be sent to a remote site by way of a modem connection or it can be sent to a printer connected to the computer system 20. The FlashPix standard provides an exemplary protocol for uniform transmitting and receiving of these graphical image files.

Pictures to be edited are loaded into the memory system 26 through conventional input devices. The pictures are digitized and stored as graphic files comprising grids of pixel values. In the illustrated embodiment, pictures are input to the memory system 26 by way of three alternative input devices—i.e., a CD-ROM 48, a floppy disk 50 and a scanner 52. Pictures stored on the CD-ROM 48 or the floppy disk 50 as graphic files preferably conform to an accepted standard, such as the FlashPix standard. The scanner 52 takes existing prints 54 and converts them to digital files that also preferably conform to the FlashPix format.

In accordance with one important aspect of the invention, an editing technique is automatically applied to each of the pixels in the area of a red-eye artifact in an original image based on a grouping of the pixels into regions of the artifact image. The editing technique includes the generation of a corrected image of a pupil that is composited with the original or source image to create a new image in which the red eye artifact has been removed. The red eye artifact in the original image, which is maintained in the video display memory 42a, is automatically parsed into regions and then re-colored based on standardized color criteria for each of the regions. By providing both the automatic parsing of the red eye artifact into regions and for a standardized re-coloring of the red eye artifact, the entire process of editing of the image is automatic, which enables the correction of the image by removing the red eye artifact by a user of the computer system 20 who has no special skills for editing or touching up images using digital painting techniques. The edited image replaces the red eye artifact with colors of varying brightness that render a natural appearance to the edited pupil area. This edited image is created without requiring anything of the user of the computer system 20 other then identifying the red eye artifact as described hereinafter.

In order to parse or divide the red eye artifact into regions, each of the pixels of the digital image in at least the area of the red eye artifact is examined with respect to reference values of the pixel's attributes. Based on this examination, the pixel is grouped into one of the regions. A mask 56 in FIG. 1 comprises a bit map and is created in order to record attributes of the pixels of the digital image. With the regions recorded in the mask 56, the mask is colored based on the map provided by the recorded regions. Each of the regions is associated with standardized coloring attributes that are applied to the mask 56 in order to create a correction image 58 that is composited with the original image to create a new image of the source image in which the red eye artifact has been removed.

The present invention is described below with reference to acts and symbolic representations of operations that are performed by the computer system 20, unless indicated otherwise. Such acts and operations are sometimes referred to as being computer-executed. In a well known and conventional manner, these acts and operations are dictated by program files, some or all of which are maintained in CD-ROM 60 or other parts of the secondary memory 44 as an application program running on the operating system of the computer system 20. Those skilled in the art of computer systems will appreciate that the acts and symbolically represented operations referred to herein include the manipulation by the CPU 24 of electrical signals representing data in a structured form. This manipulation transforms these data or maintains them at locations in the memory system 26, which reconfigures or otherwise alters the operation of the computer system 20 in a manner well understood by those skilled in the art of computer systems. The data structures where data are maintained are physical locations of the memory that have particular properties defined by the format of the data.

The digital source image 62, as shown on the screen shot 63 of FIG. 2a, is an image of a girl's face whose eyes are distorted in their appearance by an artifact caused by the red eye effect. In a conventional manner consistent with any widely accepted standard such as the FlashPix standard, the source image 62 is stored in the memory system 26 as a multiple-resolution bitmap image. In order for the user to easily and accurately mark the red eye artifact, the image 62 is enlarged on-screen as suggested by the illustration of one of the eyes in FIG. 2b. In order to enlarge the image 62, one of the higher resolution bitmaps is transferred to the frame buffer 46 for display to the user of the computer system 20.

The screen shot 63 is the user interface for marking the red eye artifact employed by Picture It! by Microsoft Corporation of Redmond, Wash. Picture It! is an application program designed for Microsoft Windows 95 for storing photographs as bitmap files, which can be edited or copied into other images. Picture It! incorporates the invention as described herein.

As suggested by the instructions on the menu 63a at the left of the screen shot 63, after the user has zoomed in on the eye 62a several alternative techniques may be employed to identify the area of the eye containing the discoloration or "red eye" artifact. In one approach, using the enlarged image of the eye 62a, the user marks the boundary of the red eye artifact using a conventional technique in which an on-screen cursor (not shown) is controlled to draw a border around the area of the red eye artifact. Alternatively, the user may simply mark a single point within the area of the red eye artifact, which is then used to automatically identify the border of the region. This automatic identification of the red eye region is based on characteristics common to all red eye artifacts—e.g., its shape tends to be compact and circular, with high color saturation and a distinct brightness maxima. These characteristics can be combined directly into a unified figure of merit that is optimized by searching for a roughly circular shape, surrounding the single point marked by the user, that maximizes these red eye characteristics. Further constraints are needed if red eyes in both eyes are identified simultaneously, which requires the user to mark each of the two red eyes. Yet another alternative for identifying the red eye region is registering the red eye region with a model as described in copending U.S. application Ser. No. 08/833,718 for "Model Based Image Editing And Correction" to Daryl T. Lawton and John A Monson, which is being filed concurrently with this application and is hereby incorporated by reference.

In keeping with the invention, the eyes 62a and 62b in the image 62 can be corrected separately or together. In the following description, only the image of the single eye 62a has been corrected, with the other eye 62b subsequently corrected in the same manner. However, the process of correcting the red eye effect can proceed equally as well after both of the eyes 62a and 62b have been marked so that the process appears to the user to correct both of the eyes at the same time.

Referring more specifically to FIG. 2b, the red eye effect is manifested as an artifact 64 found within the pupil 65 of the eye 62a. As previously mentioned, the user marks a border 66 of the red eye artifact 64, using a mouse-controlled cursor. This is the only input required by the user in order to correct the image 62 for the red eye effect. However, in this illustrated embodiment, the user must provide a closed border. In the alternative embodiment in which the user merely marks a spot within the area of the red eye artifact 64, preset criteria are used to automatically identify a closed border surrounding the artifact. In either case, after the red eye artifact 64 is marked, the user starts the process of automatically correcting the image 62 by simply moving the cursor to an icon 63a in the menu 63a of the screen shot 63 of FIG. 2a and clicking the mouse 30 in a well known manner. After the user clicks on the icon 63b in FIG. 2a, the original image 62 is automatically replaced with a corrected image.

After the editing process has been launched by outlining the discoloration and then clicking on the icon 63b, the editing process automatically creates a bitmap file that is registered with the bitmap of the enlarged original image 62 and parsed into regions. These regions are automatically colored based on preset criteria and then composited with a copy of the bitmap of the original image 62 for display. This composited image is a new image that incorporates the eye 62a as illustrated in FIG. 2c, wherein the red eye artifact 64 is removed and replaced with the correction image 58 to create a natural visual appearance of the pupil 65.

FIG. 2d illustrates the regions that are mapped onto the mask 56 based on attributes of the red eye artifact 64. The regions are recorded on the mask 56, which is held in the memory system 26 but not displayed.

In the illustration of the regions in FIG. 2d, five regions of the mask 56 are defined, some of which overlap another as illustrated in FIG. 2d. These regions are colored in accordance with preset criteria as explained more fully hereinafter. The first region is the region within the border 66 of the of the red eye artifact 64 itself—i.e., the red eye region 67. The second region is a highlight region 68 inside the red eye region 67, which is the area of the brightest pixels inside the red eye region as explained in greater detail hereinafter. The third region is the peripheral region 67a, which is the area of the red eye region 67 outside of the highlight region 68. The fourth region of the mask 56 is an inside boundary region 69, which is an apron area that lays just inside the border 66 of the red eye region 67. The fifth region of the mask 56 is an outside boundary region 70, which is an area that lays just outside the border 66 of the red eye region 67.

In addition to other attributes of the area of the red eye artifact 64 discussed hereinafter, the illustration of the regions in FIG. 2d includes two attributes of the red eye artifact. One of the attributes is the location of the brightest pixel 71 in the red eye artifact 64, which will necessarily be located within the highlight region 68. The other attribute is the location of the darkest pixel 72 of the red eye artifact 64, which is necessarily outside of the highlight region 68 as illustrated in FIG. 2d.

Figure 3:
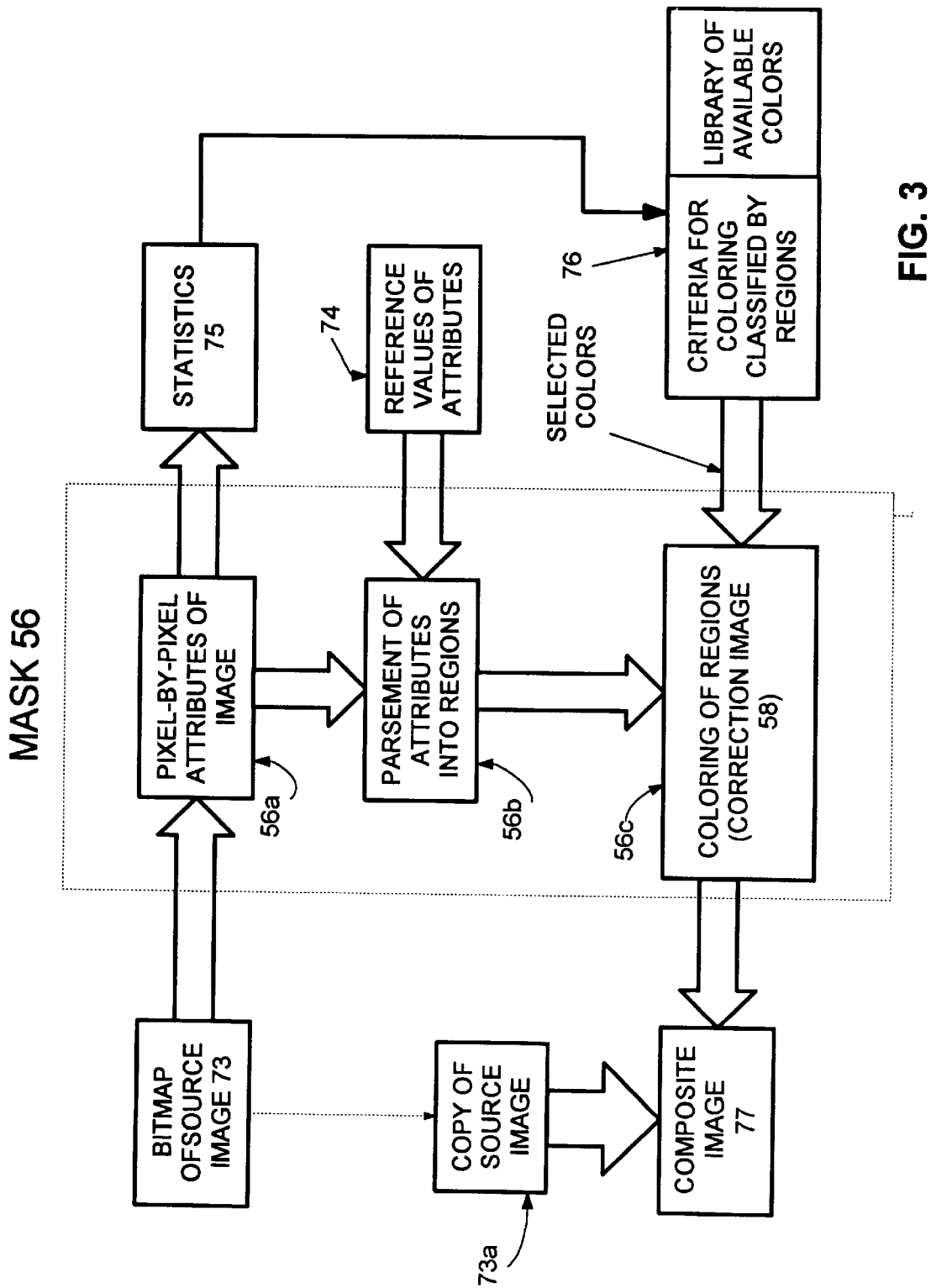
FIG. 3 is a high-level schematic diagram of the data structures for a mask that is compiled for the purpose of creating a corrected image of the red eye area, which is composited with the digitized original or source image in order to remove the red eye artifact in keeping with the invention.

Turning to FIG. 3, the data structures created by the editing process of the invention and resident in the memory system 26 are illustrated to show their interrelationship. After the user has identified the location of the red eye artifact 64 in the bitmap 73 of the source image 62, the automatic editing process of the invention fills the mask 56 with data describing the red eye artifact on a pixel-by pixel basis. The values of these attributes 56a loaded into the mask 56 are compared to reference values 74 in order to parse the mask into the regions 67, 68, 69 and 70 described in connection with the illustration of FIG. 2d. Statistics 75 are collected based on the attributes 56a and later used to select colors for coloring the regions of the mask 56. In this regard, the data in the mask 56 describing the attributes of each of the pixels of the red eye artifact 64 are marked to indicate the region in which the pixel the data represents is grouped. The bitmap of attributes and regions 56b in FIG. 3 is than compared with criteria 76 for coloring the regions whose selection is based in part on the statistics 74. RGB color data is then added to each of the data locations representing a pixel from the red eye artifact 64 that is to be repaired. With the color data added to the mask 56, it becomes a correction image 56c that is composited with a copy 73a of the bitmap 73 of the source image 62 to create a new bitmap image 77 that is displayed as the source image 62 with the red eye effect removed.

Figure 4:
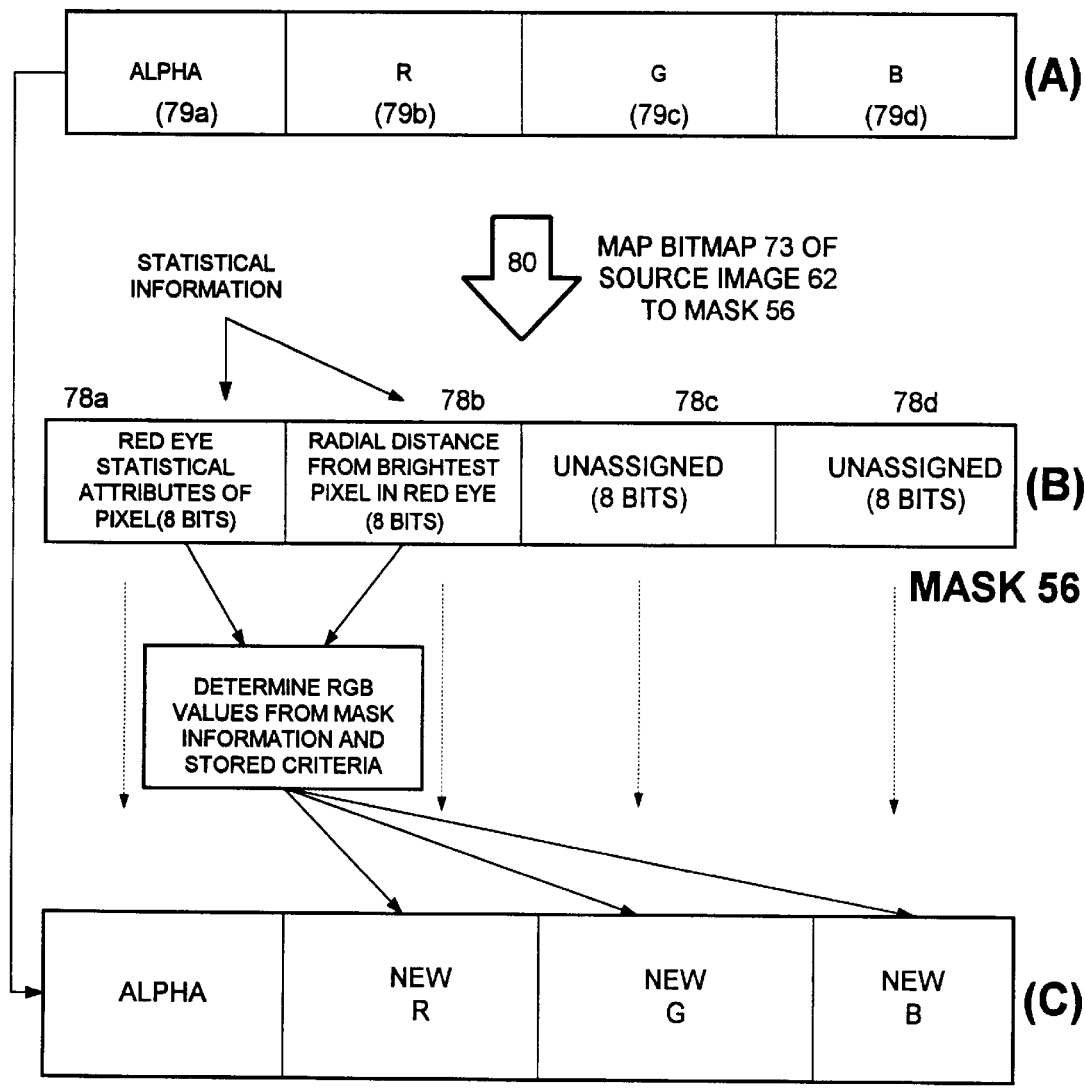
FIGS. 4a through 4c are schematic diagrams illustrating the data structures of a single pixel of the digitized image of the eye in FIGS. 2a through 2c (FIG. 4a) and a mask (FIGS. 4b and 4c) that is generated to gather the data defining the regions of the eye illustrated in FIG. 2d.

FIGS. 4b and 4c illustrate the format of a memory location 78 within the bitmap of the mask 56 containing the data for one of the pixels 79 of the bitmap 73 of the source image 62. As illustrated in FIG. 4a, the format of each one of the pixels 79 in the bitmap 73 of the source image 62 is conventional in that it includes a field for an alpha or transparency value 79a of the pixel 79 as well as values of the primary colors red (R) 79b, green(G) 79c and blue(B) 79d. A simple data structure 80 maps each one of the pixels 79 in the bitmap 73 of an area of the source image 62 including the red eye artifact 64 to one of the locations 78 of the bitmap of the mask 56, whose format is the same as that of the pixel 79 in that the mask location comprises a word divided into four(4), eight(8) bit fields 78a, 78b, 78c and 78d.

In the process of constructing a corrected pupil to be composited with the copy 73a of the original image 62, the eight-bit fields 78a–78d of the mask 56 are filled with intermediate data in FIG. 4b such as the attributes of the pixel 79, which are ultimately replaced with color data (i.e., alpha, red, green and blue)as illustrated in FIG. 4c. With the color data in place, the location 78 becomes a pixel of the correction image 58 that is copied over the pixel 79 of the copied bitmap 73a of the source image 62. The RGB color data of the location 78 in FIG. 4c replace the original color alpha and RGB values of the pixel 79 in FIG. 4a when the mask 56 is composited with the copy 73a of the original image 62.

In the illustration of the data in the mask location 78 in FIG. 4b, the first eight bit field 78a is employed as a storage location for statistical information such as the relative brightness of the source pixel 79 with respect to one of the reference values 74 (FIG. 3). The second eight bit field 78b, is employed as a storage area for a calculation of the relative radial distance of the source pixel 79 from the brightest source pixel 71 (FIG. 2d) with respect to the location of the darkest pixel 72 (FIG. 2d). This distance information is used to determine a gradient for the brightness of the corrected RGB values as explained hereinafter.

THE EDITING PROCESS

Figure 5:
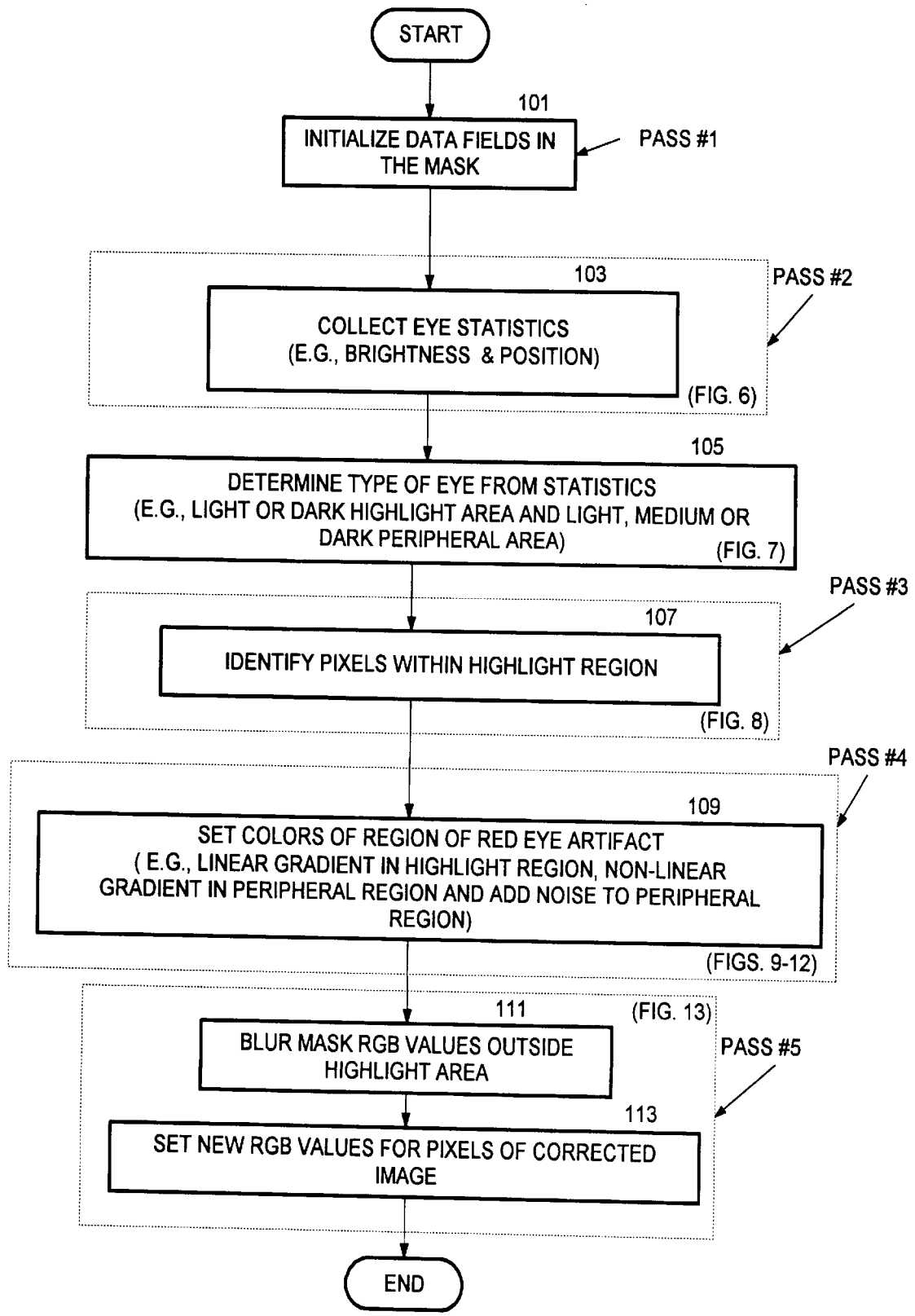
FIG. 5 is a high-level flow diagram of the steps for automatically correcting the image of FIGS. 2a through 2d in order to remove the red eye artifact from the area in and around the eye.

The editing process of the invention is generally described in the high level flow diagram of FIG. 5, which summarizes the more detailed steps for correcting the red eye effect set forth in FIGS. 6 through 13. In the following description, each of the steps of the flow diagram of FIG. 5 is described with reference to the previously described hardware, images and data structures where appropriate. For each one of the steps that summarizes a more detailed one of the flow diagrams 6 through 13, the steps of the more detailed flow diagram are described in conjunction with the associated step in the flow diagram of FIG. 5.

Each of the steps in the flow diagram of FIG. 5 is associated with a "pass," which is a sequential inspection of each of the pixels in an area defined by the border of the red eye artifact. Thus, the following description of the editing process describes each of the passes one (1) through five (5) with reference to the steps of the flow diagrams of FIGS. 5 through 13.

PASS #1 (Step 101 of FIG. 5)

In step 101 of the flow diagram of FIG. 5, the data fields in the bitmap of the mask 56 are selected for registration with the pixels of the area bitmap of the source image 62 containing the red eye artifact 64, which has been extracted by the user as described above. Also, if the size of the bitmap for the original or source image 62 is larger than the size of the mask 56, the size of the bitmap for the mask is adjusted accordingly. However, there is preferably a maximum correction area, which is arbitrarily set (e.g., 1962 pixels).

Figure 6:
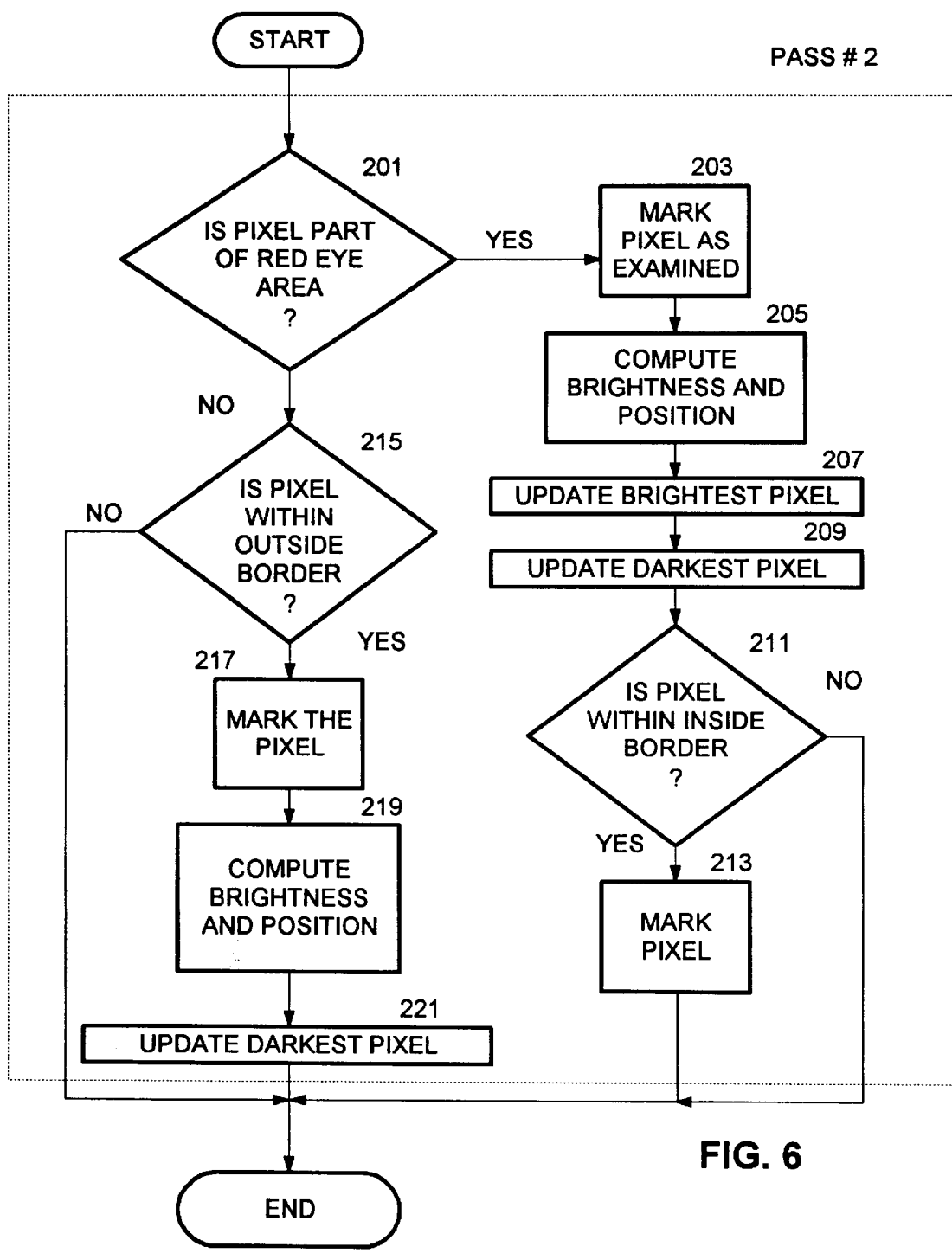
FIGS. 6 through 8 are detailed flow diagrams for the steps in the high-level flow diagram of FIG. 5 in which data for the mask defining regions of the red eye artifact is gathered.

PASS #2 (Step 103 of FIG. 5 and FIG. 6)

In step 103 of the flow diagram of FIG. 5, the statistics 75 are collected from the bitmap 73 of the source image 75 (or its copy 73a), including the brightness of each pixel 79 and the location of the pixel inside or outside of the border 66 of the red eye artifact 64 as marked by the user.

FIG. 6 is a more detailed flow diagram of step 103 in FIG. 5 describing the steps for examining each of the pixels in the bitmap 73 of the source image 62. The steps in the flow diagram of FIG. 6 are performed for each of the pixels 79 in the selected area of the source image 62.

At step 201 of the flow diagram of FIG. 6, if the current pixel 79 is part of the red eye area, then the corresponding memory location 78 in the bitmap of the mask 56 is marked at step 203. From step 203, the brightness of the pixel 79 is determined at step 205 and stored in the associated location 78 of the mask 56. Using the brightness attribute found for the pixel 79 in the bitmap 73 of the source image 62, steps 207 and 209 update a storage location in the memory system 26 recording the position of the brightest and darkest pixels 71 and 72, respectively, within the border of the red eye region 67. From step 209, the editing process continues at step 211 where the pixel 79 of the source image bitmap 73 is examined to determine whether it is within a predetermined apron area of the border of the red eye region 67, which is the inside border region 69 illustrated in FIG. 2d. If the pixel 79 of the source image bitmap 73 is inside the apron area, it is marked as part of the inside border region 69 at step 213. If the pixel 79 is not in the apron area, it is not marked in step 213 and this lack of marking indicates it is then part of a central area of the red eye region 67, which includes the highlight region 68 as discussed hereinafter in connect with step 107 in FIG. 5 and the detailed steps of the flow diagram of FIG. 8.

If the pixel 79 of the source image bitmap 73 was determined in step 201 of the flow diagram of FIG. 6 not to be part of the red eye region 67, then the pixel is further inspected at step 215 to determine whether it is within an apron area surrounding the outside of the border 66 of the red eye region 67. If the pixel 79 of the source image bitmap 73 is within this apron, then it is marked in step 217 as part of the outside region 70. In step 219, the brightness of the pixel 79 is determined and stored in the associated location 78a (FIG. 4b) of the mask 56. In step 221, a memory location in the memory system 26 maintaining the location of the darkest pixel 72 in the outside border region 70 is updated to take into consideration the brightness value of the pixel 79 presently being examined. If the pixel 79 is found to be neither within the red eye region 67 (step 201) nor within the outside border region 70 (step 215), the pixel is not marked. The steps of the flow diagram of FIG. 6 are repeated for each pixel 79 of the source image bitmap 73 that has been mapped to the red eye area identified by the user.

DETERMINING REPAIR COLORS BY EYE TYPE

Returning to the high-level flow diagram of FIG. 5, after the statistics 75 of the attributes 56a (FIG. 3) of the red eye artifact 64 have been collected in step 103, the processing of the red eye area continues at step 105 where the red eye artifact is classified to determine the colors to be used for repairing the red eye effect in the source image 62. The statistics 75 are compared against the criteria 76 in order to select colors from a set of alternative colors 76a (FIG. 3).

Figure 7:
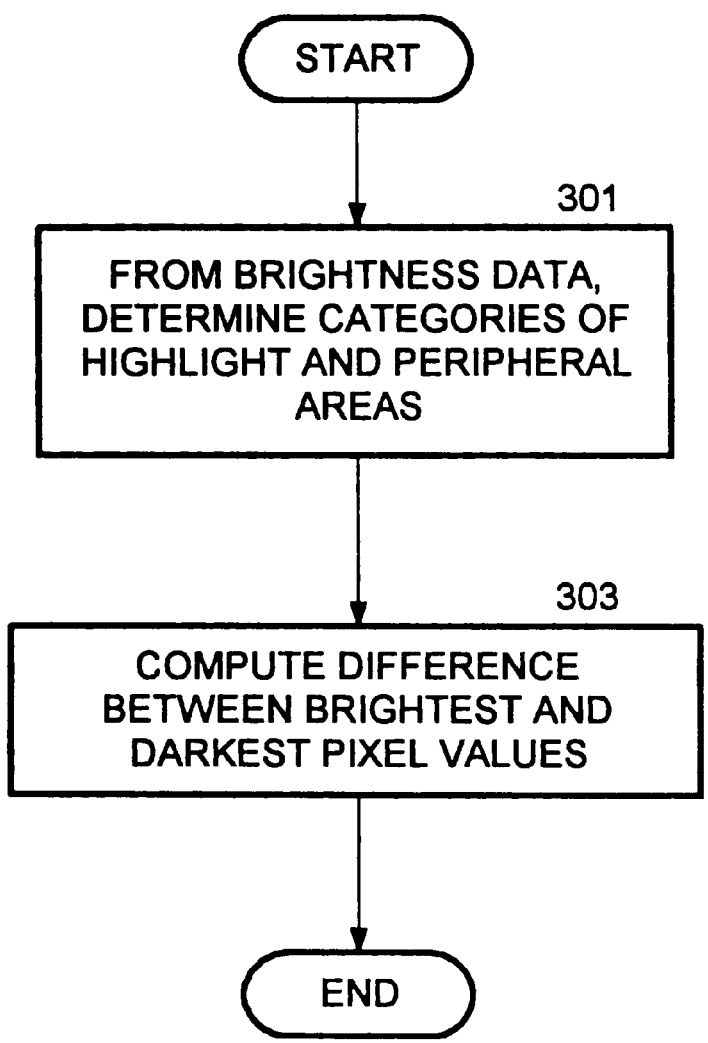

In the flow diagram of FIG. 7, the step 105 of the flow diagram of FIG. 5 is broken down into the more detailed steps 301 and 303. In step 301, the brightness of the brightest one of the pixels 79 identified in step 103 of FIG. 5 is compared with a threshold value in order to categorize the red eye artifact 64 as either a light or dark eye repair area. Each of these two categories is associated with different colors for coloring the highlight region 68. These colors are selected based on empirical evidence of the colors that give the most natural appearance to the corrected pupil area. If the value of the brightest one of the pixels 79 is above the threshold, the repair area is deemed a "light eye" repair area, which selects a bluish gray color for coloring the highlight region 68. If the value of the brightest one of the pixels 79 is below the threshold, the repair area is deemed a "dark eye" repair area, which selects a taupe color for coloring the highlight region 68. As explained more fully hereinafter, the coloring proceeds along a gradient from either the bluish gray or taupe color at the brightest pixel 71 to another color at the border of the highlight region 68. For a top part of the highlight region 68, the border color is a dark purple. For a bottom part of the highlight region 68, the border color is a dark green.

In step 301, the color for the red eye region 67 outside of the highlight region 68 (i.e., the peripheral region 67a) is also selected. The selection of the color is accomplished using the value of the darkest pixel 72 (outside value) found in the examination of the pixels 79 of the source image bitmap 73 in step 103 of FIG. 5. For this peripheral region 67a, there are three possible categories—i.e., "light eye," "medium eye" and "dark eye." To determine which category is correct for the peripheral region 67a, two threshold values are used. If the darkest pixel 72 is brighter than a medium threshold value, then the area is designated a "light eye" repair area. If the darkest pixel 72 is between the medium threshold value and a dark threshold value, then the area is designated a "medium eye" repair area. If the darkest pixel 72 is darker than the dark threshold value, then the area is designated a "dark eye" repair area. As an alternative to these categories of eye types, correction colors can simple be selected using a sliding scale.

As explained hereinafter, the coloring process for the peripheral region 67a of the red eye region 67 proceeds along a gradient from an inner color to an outer or peripheral color. The inner color is either the dark purple or dark green color at the border of the highlight region 68. The peripheral color is dependent upon the "light," "medium" or "dark" category of the peripheral region 67a. For all three of the categories, the peripheral color is a dark brown. The dark brown for any one of the three categories, however, is either lighter or darker than the dark brown of another category, with the color becoming progressively darker from "light" to "medium" to "dark" categories.

In step 303 of the flow diagram of FIG. 7, the difference between the values of the brightest and darkest pixels 71 and 72, respectively, is calculated for later use in setting a threshold for defining the area of the highlight region 68.

Figure 8:
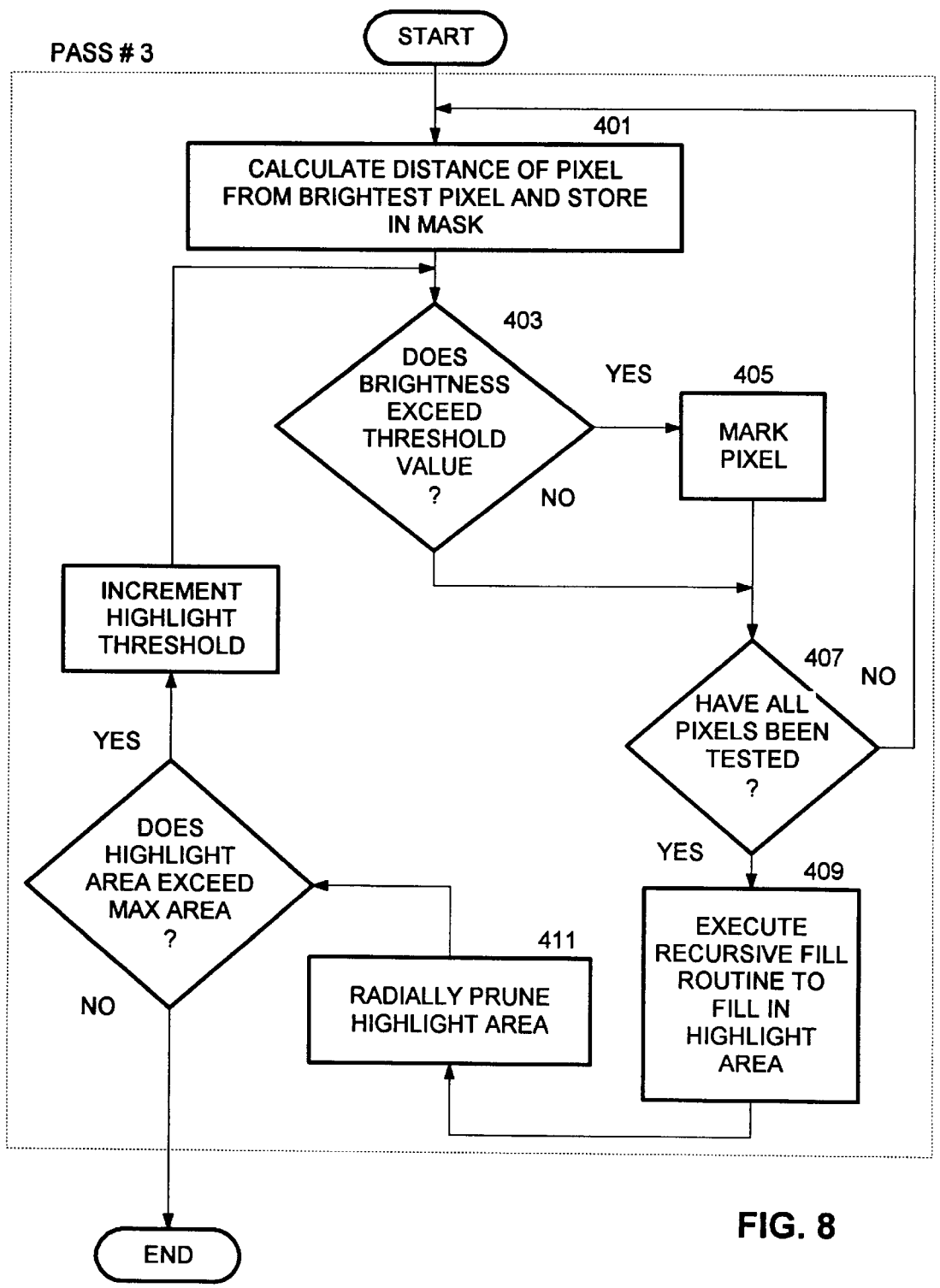

PASS #3 (Step 107 of FIG. 5 and FIG. 8)

With the attributes 56a collected and the red eye artifact 64 classified in steps 103 and 105 of the flow diagram of FIG. 5, the process moves on to another pass of the pixels 79 in the bitmap 73 of the original or source image 62 in step 107, which iterates a sequence of steps over all of the pixels in the area of the red eye artifact. In this pass over the pixel 79 of the source image 62, the pixels within the highlight region 68 are identified.

Turning to the detailed steps of FIG. 8, each of the pixels 79 in the bitmap 73 of the red eye artifact is examined at step 401 to determine its distance from the location of the brightest pixel 71. The radial distance of the selected pixel 79 from the brightest pixel 71 is stored the eight bit field 78b, of the memory location 78 of the mask 56 as indicated by the illustration in FIG. 4b. If the distance exceeds a maximum "red eye" distance, the distance is set at the maximum.

In step 403, the brightness value of the selected pixel 79 is compared to a threshold value from the reference values 74 of FIG. 3. The threshold value is selected from two alternative values, which are for "light eye" or "dark eye" selection of the highlight area. If the value of the difference between the brightness of the brightest and darkest pixels 71 and 72 calculated in step 303 of the flow diagram of FIG. 7 is greater than a reference value, then the red eye artifact 64 is classified as a "light eye" and the threshold is selected to be one of the alternative values. Otherwise, the eye is a "dark eye" and the other threshold is selected. If the brightness of the pixel 79 exceeds the threshold value in step 403, the associated location 78 in the mask 56 is marked in step 405. Also in step 405, if the distance of the pixel 79 from the brightest pixel 71 exceeds a maximum "highlight" distance, then the distance is set to the maximum value.

The same steps 401 and 405 are iterated through all of the pixels 79 in the area of the red eye artifact 64. Once the pass over all of the pixels 79 is completed as determined at step 407, the process executes a recursive fill routine in step 409. This routine is intended to mark the locations 78 of the mask 56 for any pixels 79 not marked in steps 403 and 405, but which are surrounded by pixels whose mask locations are marked. This ensures the highlight region is monolithic.

Step 411 executes a radial pruning of the highlight region 68 in order to trim away sharp breaks in the contour of the border of the highlight region that may have been created during the formation of the highlight region and particularly during the recursive fill routine. The radial pruning is a two pass process. In the first pass, intermediate calculations are performed. In the second and final pass, the pruning is done.

The two pass process is as follows:
1) PASS 1
A) If current pixel 79 is marked as part of the highlight region 68 then get the encoded distance from the location 78 in the mask 56 and add one to the number of pixels at that radius (an integer truncation). This creates an array of the number of pixels 79 at each radius.
2) INTERMEDIATE CALCULATIONS
A) Starting at radius 1, check occupation against the Radial Occupation Criteria. Upon finding the first radius that is less occupied than the Radial Occupation Criteria, stop iterating, and call this distance the Radial Prune Distance. Add one to the Radial Prune Distance found, this allows for one pixel of irregularity (produces less than perfect circle highlights).
B) Check to see if there are any pixels beyond the Radial Prune Distance, if so then perform the radial prune PASS #2.
3) PASS 2
A) Iterate over the mask 56 and remove the pixels 79 outside the Radial Prune Distance.

After the radial pruning of the highlight region 68 in step 411, the process checks the size of the region in step 413. If the size is less than the maximum, the highlight region 68 is determined and "PASS #3" is ended. If the size is greater than a predetermined maximum area, the process moves to step 415 and increments the threshold value used in step 403 to mark the mask locations 78. From step 415, the process returns to step 403 for another iteration of the threshold comparison for all of the pixels 79.

PASS #4 (Step 109 of FIG. 5 and FIGS. 9–12)

With PASSES 2 and 3 completed, the high level flow diagram of FIG. 5 moves to step 109 where the correction colors are added to the mask 56. With the color data added to the mask 56, it becomes the correction image 58 (56*c* in FIG. 3), which is composited with a copy of the source image 73*a* in order to create a new image 77 that is the source image 73 with the red eye effect removed.

COLORING THE HIGHLIGHT REGION

Figure 9:
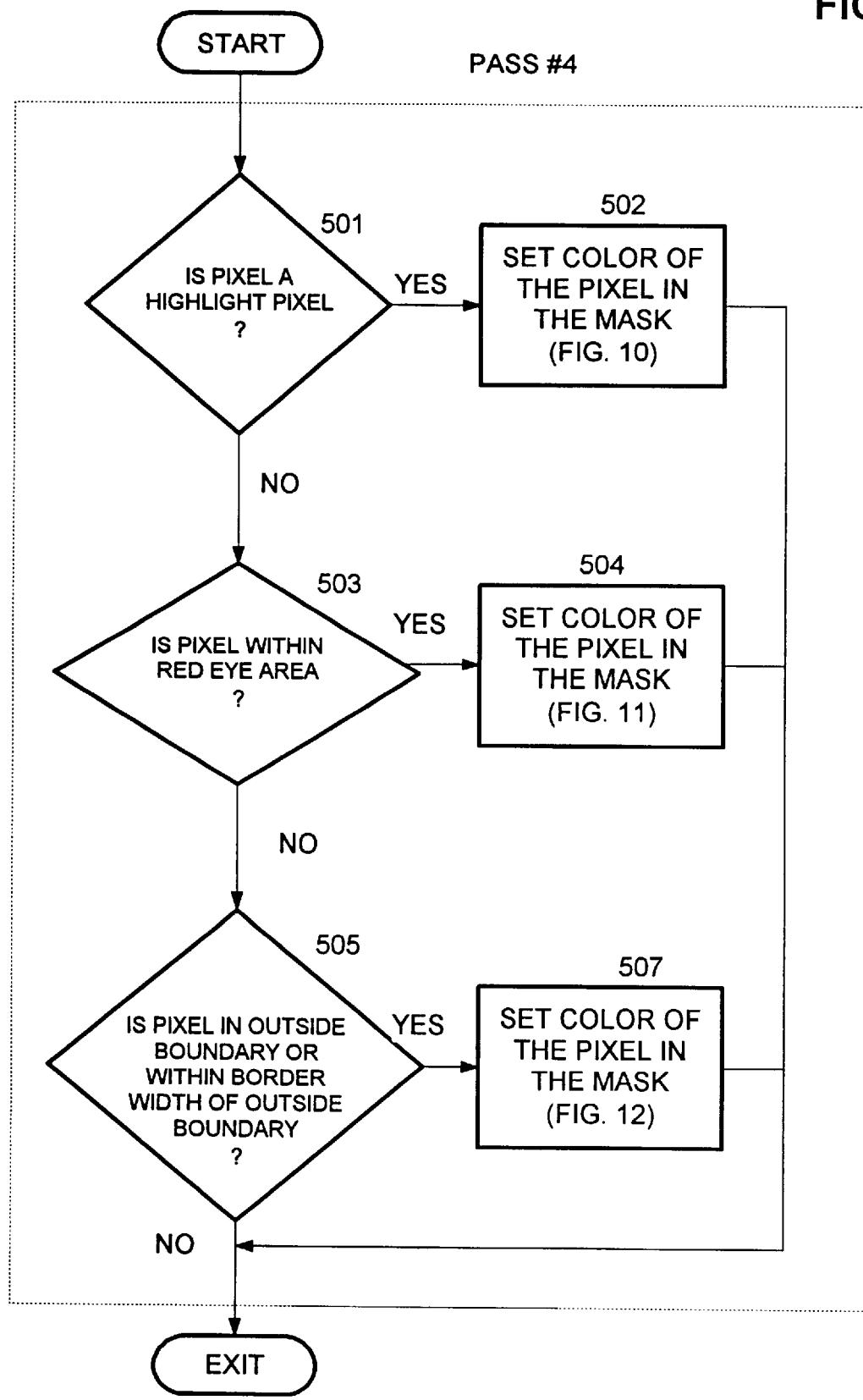
FIGS. 9 through 12 are detailed flow diagrams for the steps in the high-level flow diagram of FIG. 5 in which the regions of the mask are colored in accordance with criteria classified by regions.

With the regions of the red eye artifact 64 defined in the mask 56 from the previous passes, the process executes the steps of PASS #4 as set forth in the flow diagram of FIG. 9. In each of the steps 501, 503 and 505, the process determines from the attributes 56*b* of the memory location 78 associated with the selected pixel 79 whether the pixel is part of one of three areas—i.e., the highlight region 68(step 501), the peripheral region 67*a* (step 503) or the outside boundary region 70 or within a predetermined distance of it (step 505). These steps are repeated for each one of the pixels 79 that have been marked by their associated memory locations 78 in the mask 56.

Figure 10:
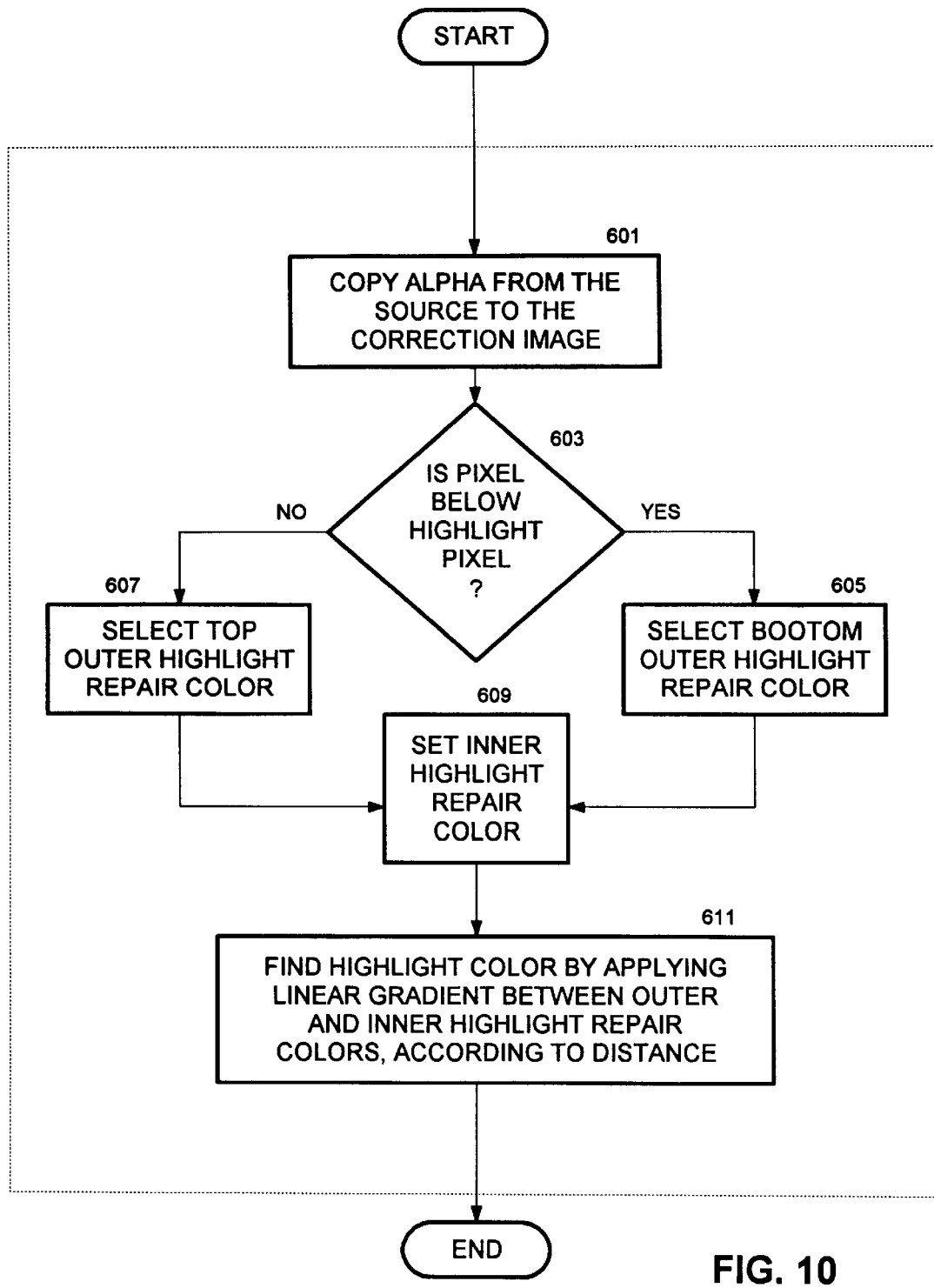

If the pixel 79 is identified as within the highlight region 68 in step 501, the flow diagram branches to step 502, which executes the steps of the flow diagram in FIG. 10. In step 601 of FIG. 10, the alpha value 79*a* of the pixel 79 is copied from the source image 62 to the correction image 58 as described in FIGS. 4*a*–4*c*. In step 603, the position of the pixel 79 in the bitmap image 73 is compared to the position of the brightest pixel 71. If the position of the selected pixel 79 is physically below the position of the brightest pixel 71, the process branches to step 605 and selects a "Bottom Outer Highlight Repair Color," which is later used as an outer color for calculating a color gradient. If step 603 determines the position of the selected pixel 79 is physically above the position of the brightest pixel 71, the process branches to step 607 and selects a "Top Outer Highlight Repair Color," which is also later used as an outer color for calculating a color gradient. In step 609, the "Inner Highlight Repair Color" for the pixel 79 is determined based on whether the eye 62*a* was found to be a light or dark eye in the steps of FIG. 7.

Based on the Inner and Outer Highlight Repair Colors determined in steps 605, 607 and 609 of FIG. 10, the correction color (RGB values) is calculated and stored in the appropriate fields of the memory location 78 as illustrated in FIG. 4*c*. The correction color is determined in step 611 by applying a linear gradient between the Outer and Inner Highlight Repair Colors and selecting a color along the gradient according to the distance value attribute stored in the memory location 78*b*. The RGB values of the correction color are written over the attribute information stored in the memory location 78 since it is no longer needed.

COLORING THE PERIPHERAL REGION

Returning to the flow diagram of FIG. 9, if the selected pixel 79 is not marked in the mask 56 as a highlight pixel, then the process branches to step 503, where the pixel attributes are examined to determine whether the pixel is otherwise within the red eye region 67 of the red eye artifact 64—i.e., in the peripheral region 67*a*. If the pixel 79 is determined to be within the peripheral region 67*a* in step 503, the flow diagram branches to step 504, where the memory location 78*a* of the mask 56 associated with the selected pixel is colored in accordance with the steps of FIG. 11.

Figure 11:
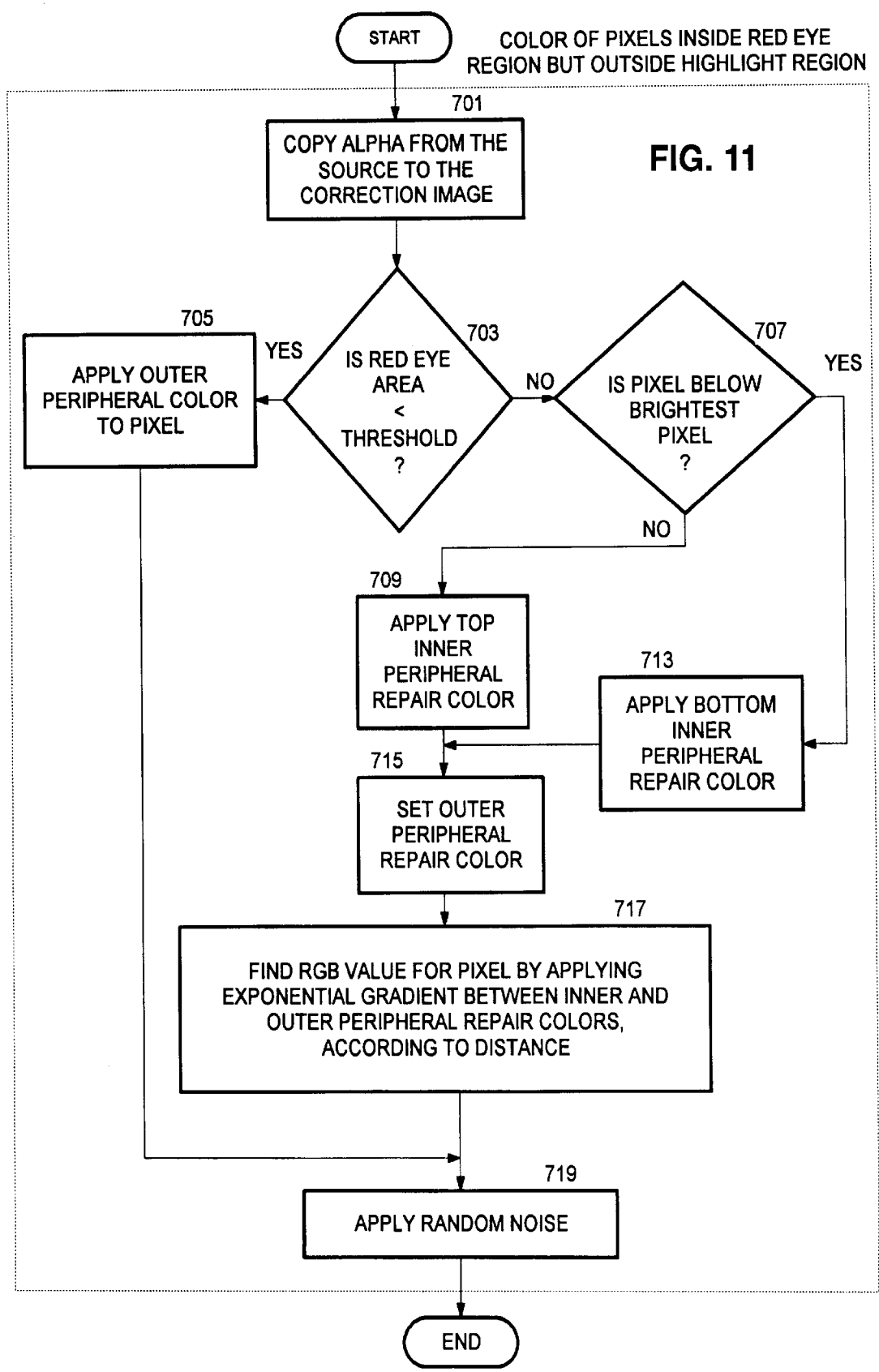

In coloring the pixel 79 in the steps of the flow diagram of FIG. 11, the alpha value 79*a* is first copied from the source image 62 to the correction image 58 in step 701 (See FIGS.

4a–4c). Next, the area of the red eye region 67 is compared to a threshold value in step 703 to determine whether the area of the region is too small for applying a gradient to the calculation of the correction color. If the area is too small, the process branches to step 705 to fill the memory location 78 of the mask 56 associated with the selected pixel 79 with the outer peripheral color. Otherwise, the process branches to step 707 where the position of the pixel 79 is examined to determine whether it is above or below the position of the brightest pixel 71.

In steps 709, 711 and 713 the Inner and Outer Peripheral Repair Colors are selected and a non-linear gradient is applied between them to determine the correction color for the mask location 78, using the distance value attribute stored in the location to locate the correction color along the gradient. If the pixel 79 is located above the brightest pixel 71, then the Top Inner Peripheral Repair Color is selected at step 709. If the pixel 79 is located below the brightest pixel 71, then the Bottom Inner Peripheral Repair Color is selected at step 711. For either situation, the same Outer Peripheral Repair Color is selected in step 715. In step 717, the correction color is found by defining a non-linear gradient whose endpoints are the Inner and Outer Peripheral Repair Colors, with the correction color located along the gradient according to the distance attribute in the memory location—associated with the pixel 79. Before the RGB values of the correction color are copied into the fields of the memory location 78 as illustrated in FIG. 4c. a random noise routine is applied to the values in step 719.

COLORING OUTSIDE BORDER REGION

Returning again to the flow diagram of FIG. 9, if the selected pixel 79 is not in the red eye region 67, then the process branches through steps 501 and 503 to step 505. If the memory location 78 of the mask 56 associated with the selected pixel 79 has been marked as within the outside boundary region 70 or within a predetermined width of the that region, then the process branches to step 507, which selects the correction color as described in the steps of FIG. 12.

Figure 12:
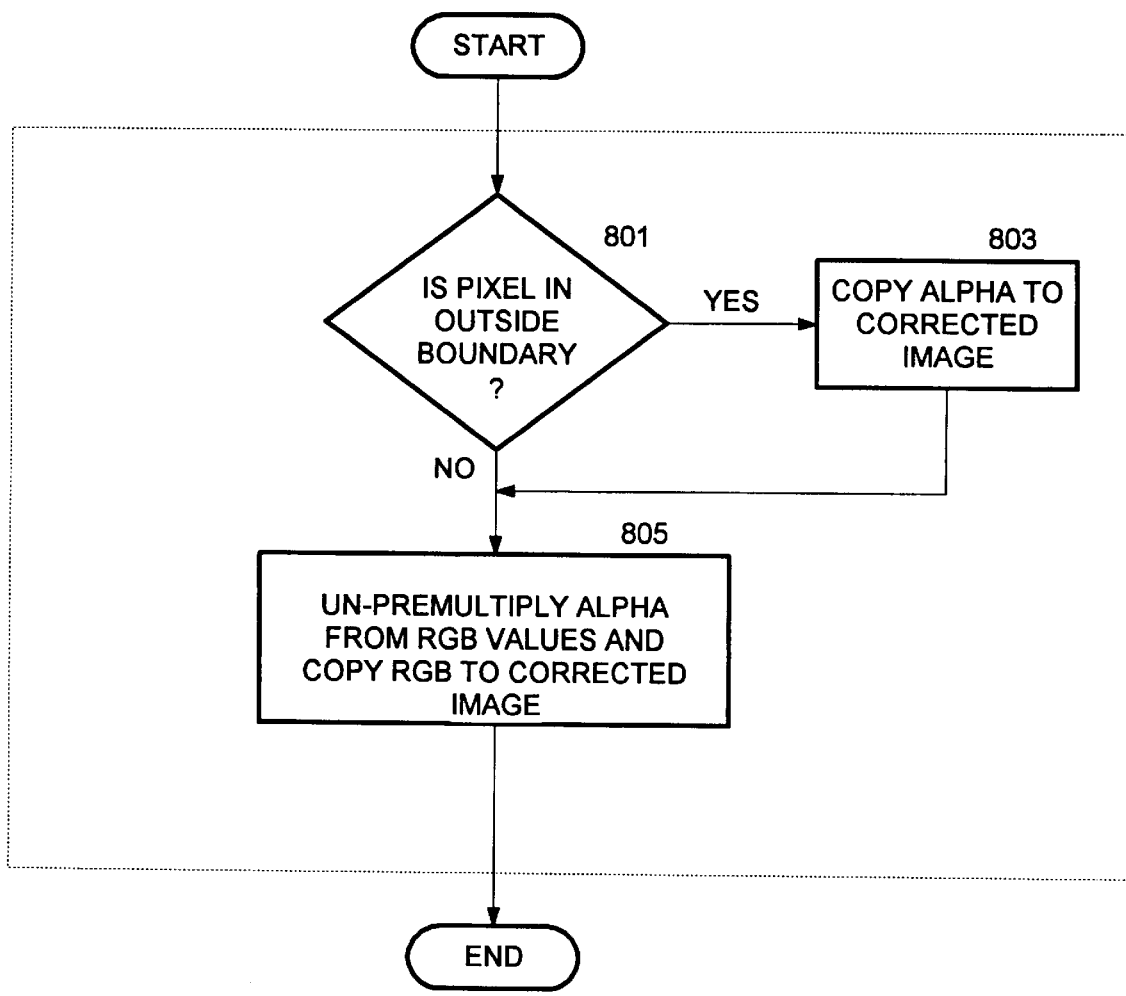

In the steps of the flow diagram of FIG. 12, the RGB value of the source pixel 79 is selected as the correction color. If the selected pixel 79 is part of the outside boundary region 70 as determined in step 801, then the alpha value 79a from the bitmap 73 of the source image 62 is copied to the mask 56 at step 803. Whether or not the pixel 79 is part of an outside boundary, step 805 is performed next to un-premultiply the alpha value 79a from the bitmap 73 for the selected pixel 79c and storing the result to the red eye correction image 58.

PASS #5 (Steps 111 and 113 of FIG. 5 and FIG. 13)

After the colors have been selected for the regions of the mask, PASS #5 applies those colors to the fields 78b, 78c and 78d of each the mask locations 78. Referring to the high level flow diagram of FIG. 5, step 111 blurs the color of a selected location 78 with the colors of surrounding eight (8) locations in the regions other than the highlight region 68. In step 113 of FIG. 3, the colors selected from selected PASS #4 are directly stored to the locations 78b, 78c and 78d. With all of the colors stored to the locations 78 of the mask 56, the mask becomes the correction image 58 that is composited with the copy of the original or source image 62 to create a corrected version of the source image in which the red eye effect has been removed and replaced with a natural-looking pupil that was generated by the editing process of the invention described above.

PASS #5 is described in detail in the flow diagram of FIG. 13 wherein step 901 begins by determining whether the selected pixel 79 is within one of the regions defined in PASSES ##2 and 3. If the pixel is not part of one of the regions, no further processing occurs. If the pixel 79 is part of one of the regions, then step 903n looks to determine whether the pixel is part of the highlight region 68. If the pixel 79 is not part of the highlight region 68, the editing process blurs the selected color at step 905 and then sets the blurred RGB values into the memory locations 78b, 78c and 78d, respectively, at step 907 with the alpha value pre-multiplied. If the pixel 79 is determined to be within the highlight region 68 in step 903, then the RGB color values are set in step 907 in the locations 78b, 78c and 78d without blurring them.

COMPOSITING THE CORRECTION IMAGE IN THE MASK WITH THE SOURCE IMAGE

With the construction of the correction image 58 completed, the process composites the correction image with the copy of the bitmap 73a copy of the bitmap 73 of the original image 62. The resulting image 77 is sent to the frame buffer 46 and displayed to the user on the display monitor 32.

Having described and illustrated the principles of the invention with reference to an illustrated embodiment, it will be recognized that the illustrated embodiment can be modified in arrangement and detail without departing from such principles. For example, parsing of the eye into different regions than those described herein may be empirically tested and determined to provide a corrected image in which the repaired pupil appears equally natural as an eye repaired using the regions described herein. Or it may be found that colors other than those described herein provide equally good results.

It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the embodiment described herein with respect to the drawing figures is only illustrative and should not be taken as limiting the scope of the invention. To the contrary, the invention as described herein contemplates all such embodiments as may come within the scope of the following claims and equivalents thereof.

We claim:

1. In a computer system, a method for automatically editing a color image to remove discoloration of the image caused by a red eye artifact, the method comprising the steps of: identifying attributes of the red eye artifact; defining regions of the red eye artifact based on the identified attributes; selecting a color for re-coloring each region of the red eye artifact based on predetermined criteria for each of the regions; and re-coloring each of the regions with the associated selected colors.

2. The method of claim 1 wherein the regions include a highlight region within the red eye artifact in which the discoloration is the brightest.

3. The method of claim 2 wherein the color of the highlight region includes a linear gradient of brightness of the color.

4. The method of claim 3 wherein the linear gradient progresses radially from a location within the highlight region that corresponds to a location of a spot in the red eye artifact that is the brightest spot in the artifact.

5. The method of claim 2 wherein the color of a region surrounding the highlight region includes a non-linear gradient of brightness that progresses radially outwardly with respect to the highlight region.

6. The method of claim 3 wherein a slope of the linear gradient is a function of a distance between the brightest and darkest spots in the red eye artifact.

7. The method of claim 1 including categories into which one or more of the regions are classified, where at least one of the categories defines color attributes for re-coloring a region classified in that category.

8. The method of claim 7 wherein one or more of the regions is divided into upper and lower portions based on the attributes of the red eye artifact and separately re-colored based on the classification of the region.

9. The method of claim 1 wherein the attributes and regions of the red eye artifact are stored in the memory as a mask that is colored and composited with the image to provide an edited image that includes the re-coloring, which corrects the discoloration caused by the red eye artifact.

10. The method of claim 1 wherein the criteria include a linear gradient of coloring in one region and a non-linear gradient in another region.

11. The method of claim 1 wherein the attributes include a location of a brightest spot within the red eye artifact.

12. The method of claim 1 wherein the image comprises pixels and the attributes include a distance each pixel is from the brightest spot in the red eye artifact.

13. The method of claim 1 wherein the regions of the red eye artifact include a highlight region, a peripheral region and inside and outside border regions.

14. A computer system for correcting a discoloration in a digital image, the computer system comprising: a source image with a red eye artifact; a mask registered with the source image and dividing the red eye artifact into regions; a tool for coloring the mask, where the color for each region is at least in part selected based on attributes of the particular region of the mask in which the color is applied; and, a composite image combining the source image and the colored mask, which visually appears as the source image with the red eye artifact replaced with a natural-looking coloring in an area of the pupil of the eye.

15. The computer system of claim 14 wherein the regions include a highlight region within the red eye artifact in which the discoloration is the brightest.

16. The computer system of claim 15 wherein the color of the highlight region includes a linear gradient of brightness of the color.

17. The computer system of claim 16 wherein the linear gradient progresses radially from a location within the highlight region that corresponds to a location of a spot in the red eye artifact that is the brightest spot in the artifact.

18. The computer system of claim 17 wherein the color of a region surrounding the highlight region includes a non-linear gradient of brightness that progresses radially outwardly with respect to the highlight region.

19. The computer system of claim 16 wherein a slope of the linear gradient is a function of a distance between the brightest and darkest spots in the red eye artifact.

20. The computer system of claim 14 including categories into which one or more of the regions are classified, where at least one of the categories defines color attributes for re-coloring a region classified in that category.

21. The computer system of claim 14 including attributes of the red eye artifact that are identified and stored in a memory as criteria for defining the regions.

22. In a computer for receiving and displaying a color image having a red eye artifact, an article of manufacture comprising a medium that is readable by the computer and that carries instructions for the computer to perform a process comprising the steps of: parsing the red eye artifact into regions; selecting a color for re-coloring the image in each of the regions of the red eye artifact based on attributes of the region; and re-coloring each of the regions with the associated selected color.

23. The article of manufacture of claim 22 wherein the regions include a highlight region within which is the brightest coloring of the red eye artifact.

24. The article of manufacture of claim 22 including the step of identifying attributes of an area of the image that includes the red eye artifact; and, defining the regions of the red eye artifact based on the identified attributes and storing the regions in the memory.

25. The article of manufacture of claim 22 wherein one of the attributes includes a location of the brightest spot in the red eye artifact.

26. A computer system for correcting a discoloration in a digital image, the computer system comprising: a source image with a red eye artifact, a mask registered with the source image and dividing the red eye artifact into regions, wherein the regions include a highlight region within the red eye artifact in which the discoloration is the brightest, and wherein the color of the highlight region includes a linear gradient of brightness of the color; a tool for coloring the mask, where the color is at least in part determined by the region of the mask in which the color is applied; and, a composite image combining the source image and the colored mask, which visually appears as the source image with the red eye artifact replaced with a natural-looking coloring in an area of the pupil of the eye.

* * * * *

UNITED STATES PATENT AND TRADEMARK OFFICE
CERTIFICATE OF CORRECTION

PATENT NO. : 6,009,209
DATED : December 28, 1999
INVENTOR(S) : Kristin Acker, et. al.

It is certified that error appears in the above-identified patent and that said Letters Patent is hereby corrected as shown below:

ON THE TITLE PAGE:

item [56],
In References Cited, OTHER PUBLICATIONS, Column 2, line 7: "Receognition" should read --Recognition--

In References Cited, OTHER PUBLICATIONS, Column 2, line 17: "re" should read --red--

In References Cited, OTHER PUBLICATIONS, Column 2, line 19: "fro" should read --from--

In Column 1, line 33: "preflash" should read --pre-flash--

In Column 13, line 28: "FIG. 4c." should read --FIG.4c,--

In Claim 26, Column 16, line 42: "artifact," should read --artifact;--

Signed and Sealed this

Sixth Day of February, 2001

Attest:

Q. TODD DICKINSON

*Attesting Officer*    *Director of Patents and Trademarks*